2 Sheets—Sheet 1.

J. ABSTERDAM.

Assignor, by mesne assignments, to M. R. ALBERGER.

Condenser for Steam-Engines.

No. 8,193. Reissued April 23, 1878.

*Witnesses*

Amos Broadway

Robert L Garrettson

*Inventor:*

John Absterdam

N. PETERS, PHOTO-LITHOGRAPHER, WASHINGTON, D. C.

J. ABSTERDAM.

Assignor, by mesne assignments, to M. R. ALBERGER.

Condenser for Steam-Engines.

No. 8,193. Reissued April 23, 1878.

Witnesses

Amos Broadnax

Robert L. Garrettson

Inventor:

John Absterdam,

N. PETERS, PHOTO-LITHOGRAPHER, WASHINGTON, D. C.

UNITED STATES PATENT OFFICE.

JOHN ABSTERDAM, OF NEW YORK, N. Y., ASSIGNOR, BY MESNE ASSIGNMENTS, TO MARY R. ALBERGER.

IMPROVEMENT IN CONDENSERS FOR STEAM-ENGINES.

Specification forming part of Letters Patent No. 58,362, dated October 2, 1866; Reissue No. 8,193, dated April 23, 1878; application filed April 2, 1878.

*To all whom it may concern:*

Be it known that I, JOHN ABSTERDAM, of the city, county, and State of New York, have invented certain new and useful Improvements in Steam-Condensers, and in the mode or means of creating and maintaining a vacuum therein; and I do hereby declare the following to be a description of the same, and of the manner of making and using it, in such full, clear, concise, and exact terms as to enable any person skilled in the art or science to which it appertains or with which it is most nearly connected to make the apparatus and practice the invention, reference being had to the accompanying drawing, making part of the description, by which is shown an apparatus in which is embodied the substance and a practical application of my invention.

Figure 1:
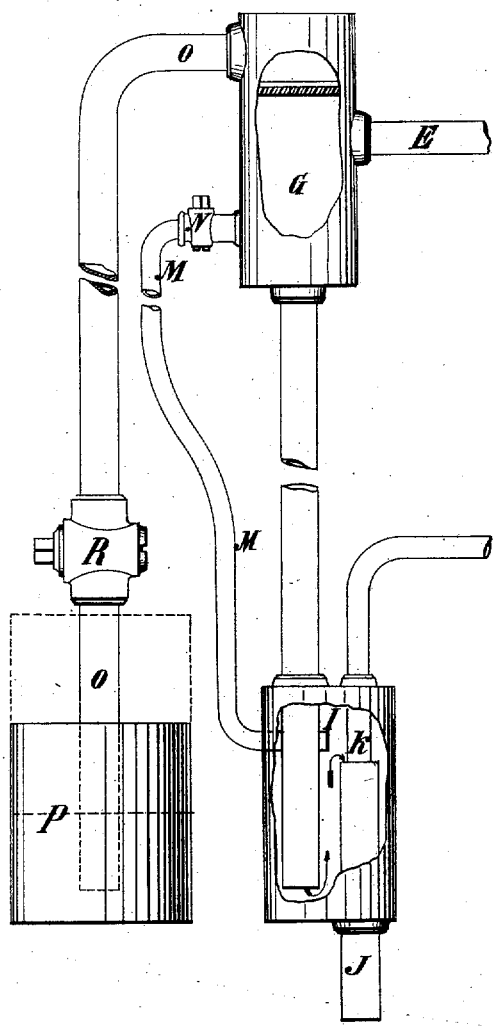
Figures 2, 3:
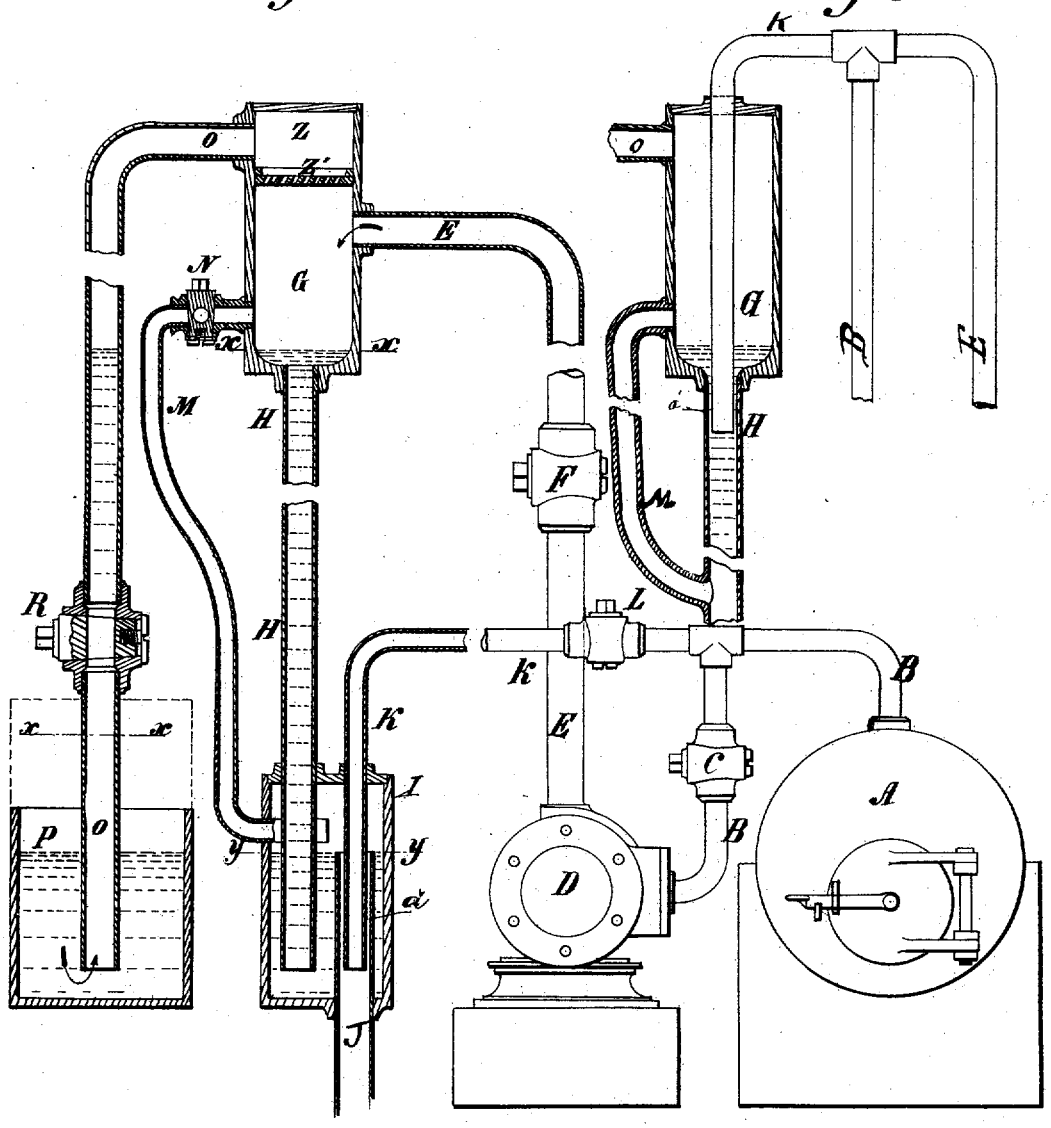

In said drawing, Figure 1 illustrates an external view of the apparatus; Fig. 2, a vertical section through the same, and Fig. 3 a detail thereof.

My invention is substantially of a novel method of creating and maintaining a vacuum in a steam-condenser or vacuum-chamber, consisting of a steam-inducting pipe combined with the condenser or vacuum-chamber, and arranged so as to enter or project into its water-discharge pipe, by which the force of the current of steam into the condenser is combined with the gravity of the column of discharge-water out of said condenser, and by which a jet of steam directly from the boiler or engine may be made to draw or blow the water and air out of the condenser or chamber, and by which the vacuum may be more effectually created and maintained by the gravity of a column of falling water out of the condenser through the discharge-pipe.

There are various ways of applying my invention.

The drawing illustrates a practical application of it; but it is not intended to limit the invention to the form of its application shown by the drawing, as many other forms will suggest themselves to a scientific or practical engineer.

Reference being had to the figures of the drawing, A represents a steam-boiler; B, a steam-pipe; C, a stop-cock therein; D, a steam-cylinder; E, an exhaust-pipe; F, a stop-cock therein; G, a condensing chamber or pipe; O, a water-injection pipe; R, a stop-cock therein; P, a cistern of water; H, a water-discharge pipe; I, a hot-well; J, a water-discharge pipe; K, a steam-inducting pipe; L, a stop-cock therein; M, an air-pipe leading to the pipe H or hot-well I; and N is a stop-cock therein.

The operation of my invention includes two distinct methods.

First method: Where it is impracticable to place the condensing-chamber in an elevated position to obtain the necessary column of falling water, as in the case of steam-vessels, for example, the vacuum is produced and maintained by blowing a blast or jet of steam directly from the boiler or engine, through the inducting-pipe K, into the discharge-pipe J or H. In case a hot-well is used, it is blown into the pipe J, as shown in the drawing by Fig. 2; but if the hot-well is dispensed with, the steam is discharged into the pipe H, as shown in Fig. 3, by which means the water and air are forced, blown, or drawn out of the condensing-chamber by the blast or momentum of the steam-current, the injection-water at the same time flowing into the condenser, over or around the nozzle of the steam-pipes, and condensing the steam, thus creating and maintaining the vacuum by the force of the steam without the aid of a column of falling water to assist in drawing the air from the condenser.

Second method: Where it is practical to place the condensing-chamber in an elevated position to obtain the necessary column of falling water, much less force is necessary to displace the water, and create and maintain the vacuum. The steam-inducting pipe is therefore led into the condenser or its discharge-pipe H, and is connected to the exhaust-pipe, so that, in creating the vacuum, the engineer can blow steam through the engine and exhaust-pipe, or can blow it directly from the boiler without passing it through the engine. The vacuum, having been created, is easily maintained by the force of the exhaust-steam upon the column of falling water in the discharge-pipe. If, however, the condenser loses it vacuum in part, a blast of steam directly from the boiler will instantly restore it; but, ordinarily, the current of exhaust-steam from the nozzle of the inducting-pipe into the condenser or discharge-pipe inclosed or covered by the injection-water will be sufficient to maintain the vacuum; and where there is no continual or successive jet of steam into the condenser or vacuum-chamber, as when the engine is stopped, or the steam shut off, the vacuum may be more effectually created and maintained by the gravity of the column of falling water, by causing it to flow out of the condenser or vacuum-chamber through the annular chamber *a'* between the steam-inducting pipe and the water-discharge pipe.

The air that enters the condenser with the steam and water will, most of it, be drawn down the discharge-pipe with the escaping column of water; but to insure a more perfect vacuum, I combine with the condensing-chamber the air-pipe M, the upper nozzle of which is arranged in the condenser above the ordinary level of the injection-water, as shown by X, and the lower end of which is led into the hot-well, if one is used, or in the water-discharge pipe, if no hot-well is used, by which the force of the discharge column of water is made available to draw out the air from above the water-level in the condensing-chamber by a separate pipe, assisted or not by a blast of steam, as the case may require.

I have stated that it is not intended to limit the invention or the Letters Patent here applied for to the form of the apparatus, or its respective parts here shown and described, for it is manifest that its several parts may be changed in form, and may be arranged in a variety of ways without departing from the spirit or substance of the invention. Thus, the condensing-chamber may be made of an entirely different form; or it may have the same form and be made much larger and smaller in diameter, and the inducting and discharge pipes may be made much larger or smaller, and the exhaust-pipe from the engine may be carried from the engine to the discharge-pipe in the hot-well, instead of the condenser or the discharge-pipe from the same; and other modifications may be made in the form of the apparatus, showing the application of the invention without the smallest departure from its principle.

The form and proportion of the respective parts, and their most advantageous relation to each other, must necessarily be left to the constructing engineer to meet the exigency of each application of the invention.

I claim as my invention and desire to secure by Letters Patent—

1. In a steam-condenser, and in combination with it and its discharge-pipes, the steam-inducting pipe, so arranged as to produce the annular opening *a'*, for the purpose of creating and maintaining a vacuum in the condenser independent of any valve, but solely by a descending column of discharge-water sufficiently high to overcome the pressure of the atmosphere.

2. The combination of the condenser-head G, the exhaust-steam pipe E, water-plate Z', air-pipe M, and water-pipe H, the latter leading from the condenser into or in connection with the air-pipe M, or into the hot-well I, to get a greater velocity of water and greater suction of air when the air and water meet in the discharge-pipe.

3. The means, substantially herein described, of creating and maintaining a vacuum in a steam-condenser, consisting of a steam-inducting pipe combined with the condenser or hot-well, and arranged in its discharge-pipe, for the purpose of combining the force of the current of steam into the condenser or discharge-pipe with the gravity of the column of water out of it through the discharge-pipe, or for the purpose of forcing the water and drawing the air out of the condenser by the force of the current of steam alone upon the column of water escaping around the inducting-nozzle at the point of condensation and escape.

4. The means, substantially herein described, of drawing the air out of the condensing-chamber from above the level of the injection-water, consisting of a pipe, M, having its upper nozzle combined with the condenser, and leading from above the level of the injection-water, and its lower nozzle inserted in the water-discharge pipe or hot-well, as the case may require.

JOHN ABSTERDAM.

Witnesses:
AMOS BROADNAX,
ROBERT L. GARRETTSON.